(12) United States Patent
Nakari et al.

(10) Patent No.: US 11,431,051 B2
(45) Date of Patent: Aug. 30, 2022

(54) BATTERY PACK, FREQUENCY CONVERTER AND TRANSPORT SYSTEM

(71) Applicant: Kone Corporation, Helsinki (FI)

(72) Inventors: Arto Nakari, Helsinki (FI); Olli Pokkinen, Helsinki (FI)

(73) Assignee: Kone Corporation, Helsinki (FI)

( * ) Notice: Subject to any disclaimer, the term of this patent is extended or adjusted under 35 U.S.C. 154(b) by 462 days.

(21) Appl. No.: 16/439,942

(22) Filed: Jun. 13, 2019

(65) Prior Publication Data

US 2020/0006727 A1 Jan. 2, 2020

(30) Foreign Application Priority Data

Jun. 28, 2018 (EP) .................................... 18180527

(51) Int. Cl.
*H01M 6/46* (2006.01)
*H01M 50/20* (2021.01)
(Continued)

(52) U.S. Cl.
CPC ....... *H01M 50/20* (2021.01); *H01M 10/0525* (2013.01); *H01M 50/502* (2021.01)

(58) Field of Classification Search
CPC . H01M 50/20; H01M 50/502; H01M 10/0525
See application file for complete search history.

(56) References Cited

U.S. PATENT DOCUMENTS

| 2011/0014501 A1* | 1/2011 | Scheucher | ............... | B60K 1/04 |
| | | | | 429/7 |
| 2012/0148877 A1 | 6/2012 | Kalman | | |

FOREIGN PATENT DOCUMENTS

| EP | 3154109 A1 | 4/2017 |
| EP | 3264495 A1 | 1/2018 |

OTHER PUBLICATIONS

European Search Report (EPO Form 1507N) for Euorpean Application No. EP 18180527 dated Oct. 25, 2018.

* cited by examiner

*Primary Examiner* — Jane J Rhee
(74) *Attorney, Agent, or Firm* — Harness, Dickey & Pierce, P.L.C.

(57) ABSTRACT

The invention relates to a battery pack, comprising a plurality of battery cells arranged consecutively. Each of said battery cells comprise a positive and a negative terminal on opposite sides of the battery cell, the battery cells being electrically connected in series with each other, wherein the terminals of the plurality of battery cells are arranged on two opposite sides of the battery pack such that positive and negative terminals of the consecutive battery cells are on both sides of the battery pack by turns next to each other. The battery pack further comprises a first and a second printed circuit board portion arranged on said two opposite sides of the battery pack, respectively. The first and the second printed circuit board portions comprise connection interfaces arranged next to the terminals of the battery cells. The first and the second printed circuit board portions comprise signal traces connected to the terminals of the battery cells via the connection interfaces. The battery pack further comprises a third printed circuit board portion arranged next to the battery cells and extending between the first and the second printed circuit board portions, such that the battery cells are located in a channel defined by the first, the second and the third printed circuit board portions. The third printed circuit board portion comprises a battery pack condition management unit connected to the signal traces of the first and the second printed circuit board portion.

16 Claims, 6 Drawing Sheets

(51) Int. Cl.
*H01M 10/0525* (2010.01)
*H01M 50/502* (2021.01)

BATTERY PACK, FREQUENCY CONVERTER AND TRANSPORT SYSTEM

This application claims priority to European Patent Application No. EP18180527.6 filed on Jun. 28, 2018, the entire contents of which are incorporated herein by reference.

BACKGROUND OF THE INVENTION

The present invention relates to a battery pack, comprising electrically series-connected battery cells. Further, the battery pack comprises printed circuit board portions with a battery pack condition management unit connected to the battery cells. The present invention relates also to a frequency converter comprising said battery pack and a transport system comprising said battery pack.

Earlier, battery packs have been lead acid based, comprising toxic and environmentally hazardous lead. These lead acid battery packs are heavy, which is not desired feature in many fields of technology for example in transport systems. Furthermore, lead acid battery packs have relatively short lifetime and therefore they need to be replaced frequently, requiring labor and downtime of the system they are connected to due to maintenance.

To overcome issues related to the lead acid battery packs, other types of batteries, for example lithium-ion batteries, have been used in some applications. However, lithium-ion battery cells may cause fire when overcharged. Also, the lifetime of the lithium-ion battery cells reduces substantially when they are overheated. Hence, lithium-ion battery cells require overcharge and temperature monitoring. The overcharge monitoring has been solved by measuring voltage across lithium-ion battery cell and balancing the voltage by connecting a discharge load across the terminals of the lithium-ion battery cell. In earlier battery packs, the voltage measurement and balancing means have been connected with separate wiring to a lithium-ion battery cells, which may cause electromagnetic interference and reduce the reliability of the battery pack when exposed to electromagnetic interference. Furthermore, if these battery packs are exposed to mechanical stress, the wiring and particularly the soldering between the wiring and the battery cell terminals, the voltage measurement means and the balancing means may fail over time. In addition, manufacturing of battery packs with complex wiring requires manufacturing labor and exposes the battery pack to reliability issues related to soldering quality.

SUMMARY OF THE INVENTION

It is therefore object of the present invention to provide a solution in order to solve at least one of the above mentioned problems. Therefore, a battery pack is introduced, which requires less manufacturing labor, provides improved safety and reliability, provides longer lifetime and causes less electromagnetic interference. Also, it is object of the invention to provide a frequency converter and a transport system comprising said battery pack.

This object is solved with a battery pack according to claim 1, a transport system according to claim 21 and a frequency converter according to claim 22. Preferred embodiments of the invention are subject matter of the dependent claims. Some of advantageous embodiments of the invention are also disclosed in the description and drawings.

A first aspect of the invention is a battery pack comprising a plurality of battery cells, which are arranged consecutively.

Each battery cell comprises a positive and a negative terminal on opposite sides of the battery cell. The adjacent battery cells are electrically connected in series with each other. The terminals of the plurality of battery cells are arranged on two opposite sides of the battery pack such that positive and negative terminals of the consecutive battery cells are on both sides of the battery pack by turns next to each other. Further, the battery pack comprises a first and a second printed circuit board portion, which are respectively arranged on the two opposite sides of the battery pack. The first and the second printed circuit board portion comprises connection interfaces, which are arranged next to the terminals of the battery cells. The first and the second printed circuit board portion comprises signal traces, which are connected to the terminals of the battery cells via the connection interfaces. Also, the battery pack comprises a third printed circuit board portion, which is arranged next to the battery cells. The third printed circuit board portion extends between the first and the second printed circuit board portions, such that the battery cells are located at least partially in a channel, which is defined by the first, the second and the third printed circuit board portions. The third printed circuit board portion comprises a battery pack condition management unit, which is connected to the signal traces of the first and the second printed circuit board portion. The signal traces on the printed circuit board portions substitute the need of separate wiring. By using the printed circuit board portions, the spacing between signal traces may be predetermined and fixed constant reducing electromagnetic interference even if the battery pack is exposed to mechanical stresses such as vibration, shocks, etc. Also, the printed circuit board portions may be designed as multilayer printed circuit boards comprising ground layers, which may for example sandwich other printed circuit board layers, thus further reducing electromagnetic interference. The reduced electromagnetic interference results in improved reliability of external components close to the battery pack and/or internal components of the battery pack for example the battery pack condition management unit. Also, the reduced electromagnetic interference results in reduced need of filtering around the battery pack and/or electrical insulation of the battery pack. Furthermore, because of the printed circuit board portions battery packs with smaller form factor may be manufactured, because separate wiring is not needed and the printed circuit board portions do not require much space around the battery cells. Hence, battery packs may be used in limited spaces, which is beneficial in many applications; for example they may be easily integrated into frequency converters, motor drives and transport systems, which may preferably be elevators, escalators or moving walkways. For example, in elevator application a battery pack may be located in an elevator shaft, in a machine room, in an elevator car, in connection with elevator components or integrated in elevator components. Such elevator components could be for example a frequency converter, elevator control cabinet and a landing door frame. In addition, printed circuit board portion production requires less manufacturing labor compared to wiring. Furthermore, printed circuit board portion production may be automatized, which results in steady manufacturing quality as human errors are omitted. Thus, improving average quality and reliability of the battery packs. The battery pack condition management unit monitors the battery cells and thus improves the safety and lifetime of the battery pack.

In a preferred embodiment of the invention, the battery cells of the battery pack are lithium-ion battery cells. By this means, the battery pack may be more pro-environmental and lighter compared to different types of batteries for example lead acid batteries and therefore the battery pack may be more suitable to different applications such as transport systems. Also, lithium-ion battery cells have longer lifetime compared to lead acid batteries and therefore require less maintenance as for example the battery replacement is required less often. Therefore, the battery pack according to the invention causes less downtime of the system, which they are used in.

Preferably, the shape of the battery cells is cylindrical. By this means, common off-the-shelf battery cells may be used in battery pack manufacturing. Generally, this kinds of general battery cells are mass produced and therefore cheap and reliable. Thus, improving the reliability and reducing the manufacturing cost of the battery pack.

Preferably, the battery cells are arranged side by side in at least two rows. Via this measure, battery cells may be arranged such that less wasted space is between adjacent battery cells. Thus, the battery cells require less space and therefore the battery pack and/or the first printed circuit board portion and/or the second printed circuit portion and/or the third printed circuit portion may be designed and manufactured smaller.

In a preferred embodiment of the invention, the battery cells are connected in series by means of nickel strips, which are welded between the positive and negative terminals of the consecutive battery cells. By this means, welded nickel strips provide low impedance connection between the terminals of the battery cells, reducing power losses. Thus, energy efficiency of the battery pack may be improved. Additionally, welding the terminals together with nickel strips attaches the battery cells tightly to each other, providing the battery pack a rigid structure.

In a preferred embodiment of the invention, the third printed circuit board portion is connected through connectors to the signal traces of the first and the second printed circuit board portions. Thus, manufacturing and especially assembly of battery packs is easier and faster. Maintenance of battery packs is also faster and easier as the printed circuit board portions may be replaced without additional wiring. Also, reliability of connections between the printed circuit board portions is improved. The connectors may be for example Video Graphics Array (VGA) connectors, serial port connectors or pin header connectors, which are mounted to the first and/or the second and/or the third printed circuit board portion.

Preferably, the third printed circuit board portion comprises output terminals of the battery pack. By this means, the battery pack design is compact, reducing the length of traces connected to the output terminals of the battery pack and therefore reducing the electromagnetic interference.

Preferably, at least one of the first and the second printed circuit board portion comprises a power trace connected between a battery cell terminal and an output terminal of the battery pack. The cross-sectional area of a power trace is larger than the cross-sectional area of a signal trace. Hence, the current-carrying capacity of a power trace is higher compared to a signal trace. Thus, the series connected battery cells may supply power to the output terminals of the battery pack via the power trace without separate wiring. The printed circuit board portions may be designed as multilayer printed circuit boards comprising ground layers, which may for example sandwich power traces, thus reducing electromagnetic interference.

In a preferred embodiment of the invention, the third printed circuit board portion is connected through a power connector to the power trace of the at least one of the first and the second printed circuit board portions. Thus, manufacturing and especially assembly of battery packs is easier and faster. Maintenance of battery packs is also faster and easier as the printed circuit board portions may be replaced without additional wiring. Also, reliability of power connections between the printed circuit board portions is improved.

In an embodiment of the invention, the third printed circuit board portion is connected through at least one flexible link to the signal traces of at least one of the first and the second printed circuit board portions. The flexible link allows to move one printed circuit board portions respective to other printed circuit board portions without disconnecting the connections between the printed circuit board portions e.g. connectors or power connectors. Hence, maintenance and fault diagnosing of the battery pack is easier as a serviceman may move the circuit board portions exposing parts of the battery pack which would otherwise require disassembly of the printed circuit board portions and/or battery cells. Also, flexible link allows to connect the printed circuit board portions to each other before the signal traces are connected to the terminals of the battery cells via the connecting interfaces, making the manufacturing and especially the assembly of the battery pack easier.

Preferably, the flexible link comprises a printed circuit board portion which is less than 255 micrometers thick and comprises flexible solder mask. By this means, a thin printed circuit board may be used as a flexible link. For example, printed circuit board, comprising less than 255 micrometers thick glass-reinforced epoxy laminate material such as FR-4 and flexible solder mask, is bendable and may be used as a flexible link. Preferably, the third printed circuit board portion, the flexible link and the at least one of the first and the second printed circuit board portions may be manufactured from a single printed circuit board, wherein the flexible link has different thickness compared to the other printed circuit board portions. This different thickness could be manufactured by for example depth milling the flexible link areas in said single printed circuit board. Thus, separate connectors are not needed between the printed circuit board portions. Also, this simplifies the manufacturing process of the battery packs.

In an alternative embodiment, the flexible link comprises a dielectric film which is less than 255 micrometers thick and comprises electrically conducting traces. By this means, a flexible link, which allows a lot back-and-forth bending and bending the flexible link in a steep angle, may be provided.

In a preferred embodiment of the invention, the third printed circuit board portion is perpendicular to the first and the second printed circuit board portions. By this means, battery packs with smaller form factor may be manufactured as the printed circuit board portions may be space efficiently arranged around the battery cells. Hence, battery packs with smaller form factor may be used in limited spaces, which is beneficial in many applications for example in connection with frequency converters, motor drives and transport systems, which may preferably be elevators, escalators and moving walkways.

In a preferred embodiment of the invention, the battery pack condition management unit comprises a voltage measurement unit connected to the signal traces of the first and the second printed circuit board portion. The condition of a battery cell may be determined based on the voltage across terminals of a battery cell or statistically based on battery cell voltage information over a period of time. For example, battery cell voltage exceeding or being under a threshold value may indicate that the condition of a battery cell is poor, has changed or the battery cell might fail soon. Also, the condition of battery cells might be determined based on too fast decrease and/or increase in the battery cell voltage during charging or when the battery pack is loaded. The condition management unit comprising voltage measurement unit makes the third printed circuit board portion compact as the signal traces are directly connected to the voltage measurement unit without separate connectors and/or wiring.

Preferably, the voltage measurement unit is configured to measure or detect voltage across the battery cell terminals. The voltage measurement unit may measure voltage across terminals of each battery cell by measuring the voltage across every signal trace connected to the connection interfaces of the battery cell terminals. Also, the voltage measurement unit may detect the voltage across terminals of each battery cell by first measuring voltage across some of said signal traces and then calculating the voltage across terminals of each battery cell. Thus, the voltage across battery cell terminals may be detected with less measurements, saving time.

Preferably, the third printed circuit board portion comprises a communication link to communicate with an external device, and wherein the battery pack condition management unit is configured to send operational information of the battery pack via the communication link. In case the battery pack condition management unit determines that the condition of the battery pack has changed for example a battery cell has failed or the condition of a battery cell has decreased indicating that the battery pack may fail, it is advantageous that operational information comprising such condition information is sent to an external device. The external device may be for example a frequency converter, a motor drive, a controller, preferably an elevator controller, remote monitoring center or cloud computing system. Hence, a maintenance need for the battery pack could be determined by the external device based on that operational information and respective actions could be taken even before the battery pack actually fails. Thus, safety and reliability of the system to which the battery pack is connected to is improved. Also, the downtime of the system to which the battery pack is attached to is reduced.

In a preferred embodiment of the invention, the output terminals and the communication link are combined to a single output connector on the third printed circuit board portion. Therefore, connection of the battery pack to is easy and fast and smaller form factor may be achieved.

In a preferred embodiment of the invention, the battery pack condition management unit comprises a non-volatile memory. Hence, for example operational information of the battery pack may be stored to the non-volatile memory for further use.

Preferably, the battery pack condition management unit is configured to store voltage detection results of the voltage measurement unit to the non-volatile memory. By this means, the battery pack condition management unit may use the voltage detection results later.

Preferably, the battery pack condition management unit is configured to determine the condition of at least one battery cell by comparing voltage detection results of the voltage measurement unit to the voltage detection results stored in the non-volatile memory. Thus, the condition of battery cells may be determined.

In a preferred embodiment of the invention, the battery pack condition management unit comprises at least one discharge load and at least one switch. Further, the battery pack condition management unit is configured to connect the discharge load by means of the switch across terminals of at least one battery cell. Overcharging of battery cells may cause fire hazard and/or for example in case of lithium-ion battery cells, it may cause plating of metallic lithium compromising safety. By this means, the charge level of battery cells may be controlled by connecting the discharge load across battery cell terminals, discharging the overcharge of a battery cell and improving the safety, lifetime and reliability of the battery pack.

According to a second aspect of the invention, the frequency converter comprises a battery pack according to the first aspect of the invention. Further, the frequency converter comprises a rectifier bridge, which is electrically connected or connectable to a grid, an inverter bridge to supply a motor and a direct current link, comprising a capacitor. The direct current link is connecting the rectifier bridge and the inverter bridge. Further, the output terminals of the battery pack are electrically connected either directly or via a separate converter to the direct current link of the frequency converter. The frequency converter, comprising the battery pack with reduced electromagnetic interference, has reduced need of filtering, reduced need of electrical insulation and improved reliability. The battery pack with smaller form factor enables to manufacture smaller frequency converters. Hence, frequency converters may be used in limited spaces, which is beneficial in many applications for example in motor drives and transport systems, which may preferably be elevators, escalators or moving walkways. For example, in elevator application the frequency converter may locate in an elevator shaft, in a machine room or in an elevator car. Thus, if the size of the frequency converter is small, for example larger elevator car may be used.

According to a third aspect of the invention, the transport system comprises a battery pack according to the first aspect of the invention. The transport system, comprising the battery pack with reduced electromagnetic interference, has reduced need of filtering, reduced need of electrical insulation and improved reliability. The battery pack with smaller form factor requires less space and therefore more space may be used for carrying larger and/or more items and/or people. The transport system may be an elevator system, an escalator system, a moving walkway, a belt conveyor, a vehicle or a train. For example, in elevator application the battery pack may locate in an elevator shaft, in a machine room, in an elevator car, in connection with elevator components or integrated in elevator components. Such elevator components could be for example a frequency converter, elevator control cabinet and a landing door frame. Thus, if the size of the battery pack is small, for example larger elevator car may be used.

It shall be clear for the skilled person that the above-mentioned embodiments may be combined with each other arbitrarily.

BRIEF DESCRIPTION OF THE DRAWINGS

The invention is now described hereinafter with respect to the enclosed drawings. In these drawings

DESCRIPTION OF THE PREFERRED EMBODIMENTS

It is emphasized that identical parts or parts with the same functionality are designated by the same reference numbers in all figures.

Figure 3:
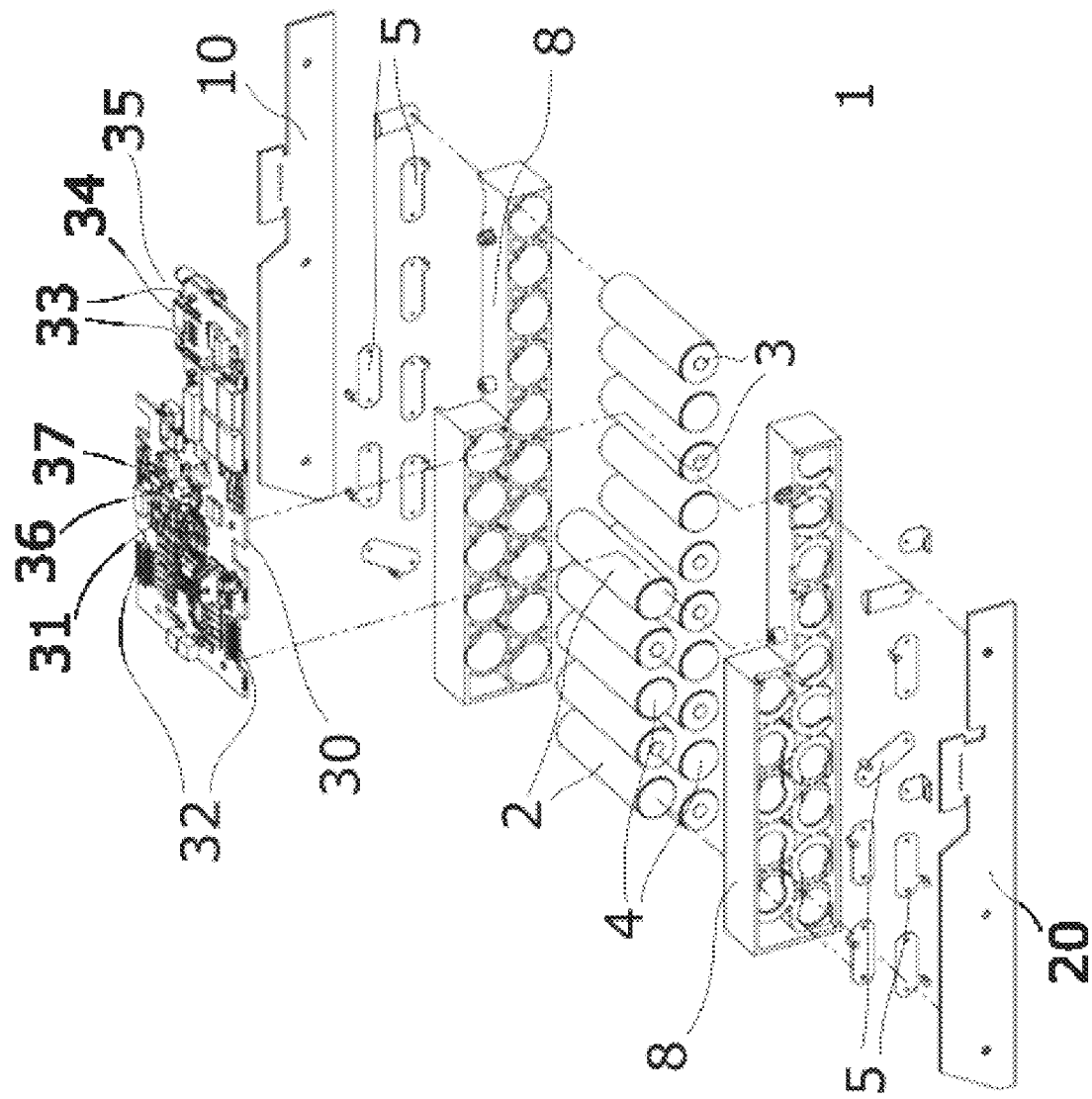
FIG. 3 shows an exploded view of a battery back according to an embodiment.

FIG. 3 shows an exploded view of a battery back 1. The battery pack 1 comprises a plurality of battery cells 2, which are arranged consecutively. Preferably, the battery cells 2 of the battery pack 1 are lithium-ion battery cells 2. Each battery cell 2 of the battery pack 1 comprises a positive terminal 3 and a negative terminal 4 on opposite sides of the battery cell 2. A preferred shape of the battery cells 2 is cylindrical. The battery cells 2 are electrically connected in series with each other. The terminals 3, 4 of the plurality of battery cells 2 are arranged on two opposite sides of the battery pack 1 such that positive and negative terminals 3, 4 of the consecutive battery cells 2 are on both sides of the battery pack 1 by turns next to each other as illustrated in FIG. 3. Additionally, the battery cells 2 may be arranged side by side in at least two rows as shown in the FIG. 3.

Figure 2:
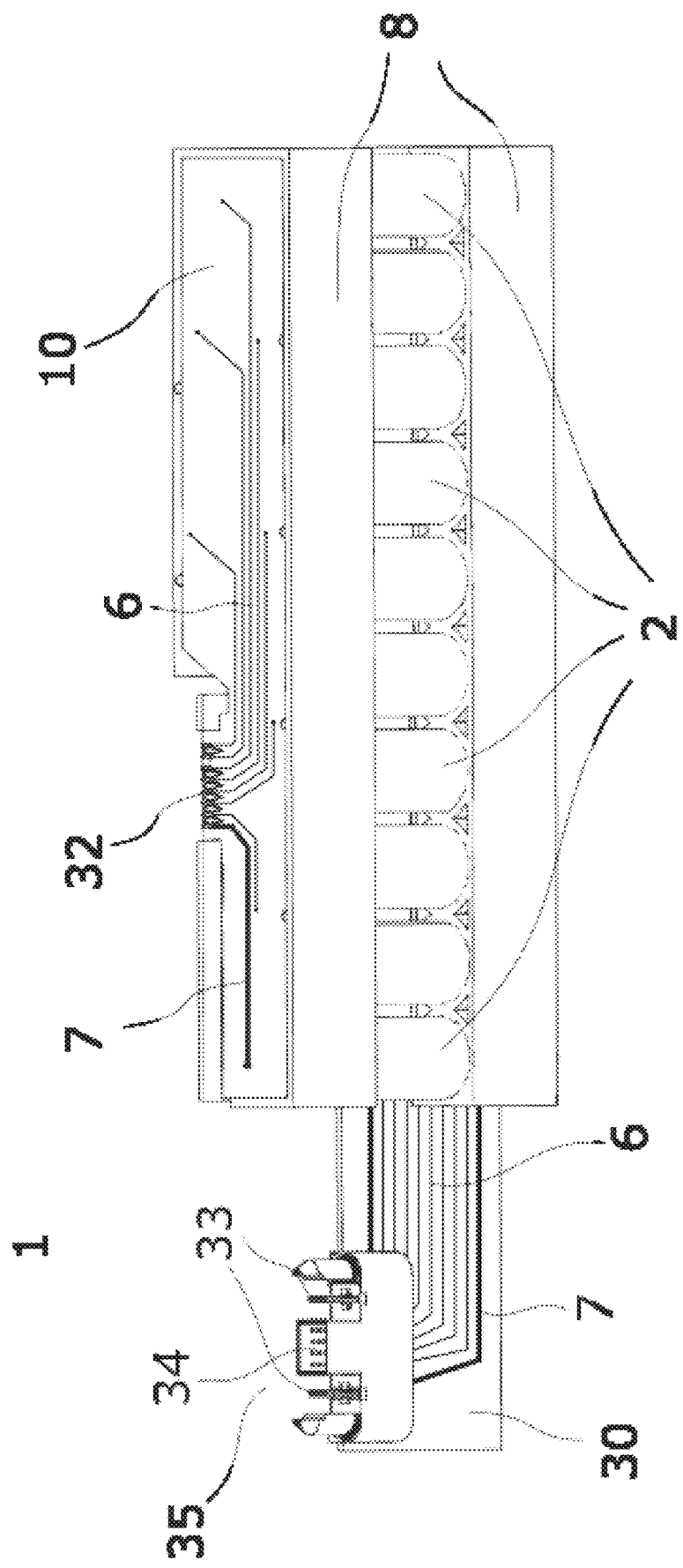
FIG. 2 shows a side view from another side of a battery pack of FIG. 1.

Further, the battery pack 1 comprises a first printed circuit board portion 10 and a second printed circuit board portion 20, which are respectively arranged on the two opposite sides of the battery pack 1 as shown in the FIG. 3. Further, the first and the second printed circuit board portion 10, 20 comprises connection interfaces 5, which are arranged next to the terminals 3, 4 of the battery cells 2. In a preferred embodiment, the connection interfaces 5 are nickel strips 5, which are welded between the positive and negative terminals 3, 4 of the consecutive battery cells 2, connecting the battery cells 2 in series. The first and the second printed circuit board portion 10, 20 comprises signal traces 6, which are illustrated in FIG. 2. and which are connected to the terminals 3, 4 of the battery cells 2 via the connection interfaces 5. The connection interfaces 5 may be connected to the signal traces 6 on the first and the second printed circuit board portions 10, 20 by a solder connections to vias, which are on said printed circuit board portion 10, 20 and further connected to the signal traces 6. Additionally or alternatively, the connection interfaces 5 comprise overhangs or pins which are soldered to pads or through holes connected to the signal traces 6 on said printed circuit board portions 10, 20.

Figure 1:
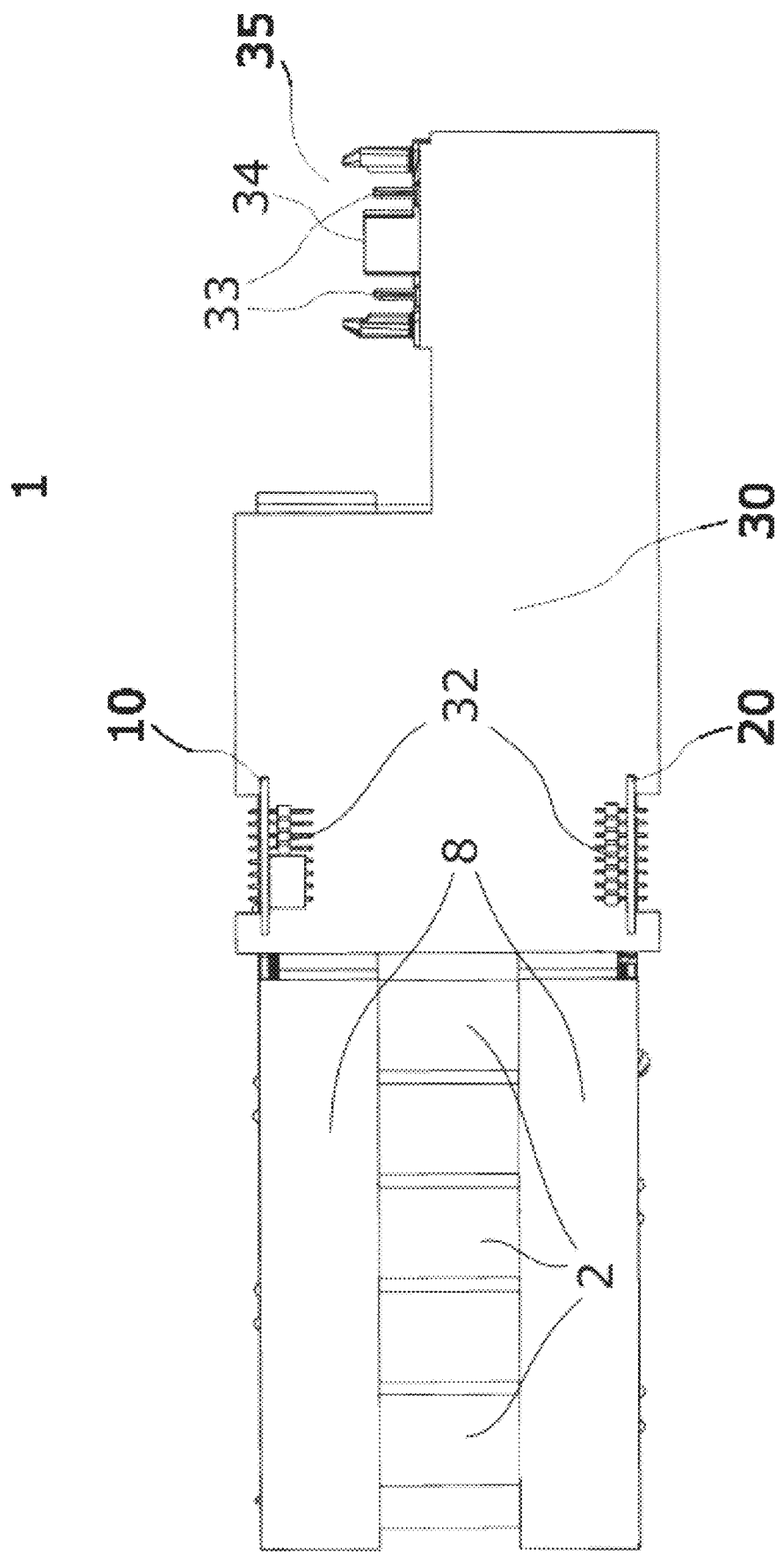
FIG. 1 shows a side view of a battery pack according to an embodiment.

FIG. 1 shows a side view of a battery pack 1. To facilitate understanding of the matter, components 31, 36, 37, signal traces 6 and power traces 7 are not illustrated in FIG. 1. Further, the battery pack 1 comprises a third printed circuit board portion 30, which is arranged next to the battery cells 2. The third printed circuit board portion 30 extends between the first and the second printed circuit board portions 10, 20, such that the battery cells 2 are at least partially located in a channel, which is defined by the first, the second and the third printed circuit board portions 10, 20, 30. The third printed circuit board portion 30 comprises a battery pack condition management unit 31, which is connected to the signal traces 6 of the first and the second printed circuit board portion 10, 20.

The third printed circuit board portion 30 is connected through connectors 32 to the signal traces 6 of the first and the second printed circuit board portions 10, 20 as shown in the FIG. 2. Preferably, the connectors 32 are pin header connectors 32. Additionally, the third printed circuit board portion 30 comprises signal traces 6, which may connect the connectors 32 to other components 31, 33, 34, 35, 36, 37 on the third printed circuit board portion 30.

The third printed circuit board portion 30 comprises output terminals 33 of the battery pack 1. Additionally, the third printed circuit board portion 30 comprises signal traces 6 and/or power traces 7, which connect the output terminals 33 to other components 31, 32, 34, 37 on the third printed circuit board portion 30.

At least one of the first and the second printed circuit board portion 10, 20 comprises a power trace 7 connected between a battery cell terminal 3, 4 and an output terminal 33 of the battery pack 1. A power trace 7 is preferably connected to a connection interface 5 of battery cells 2. Preferably, the power trace 7 is connected to the output terminal 33 via connector 32 and a power trace 7 on the third printed circuit board portion 30. The cross-sectional area of a power trace 7 is substantially larger than the cross-sectional area of a signal trace 6. Additionally or alternatively, the third printed circuit board portion 30 is connected through a power connector 32 to the power trace 7 of the at least one of the first and the second printed circuit board portions 10, 20.

The above described connections between the first, the second and the third printed circuit board portions 10, 20, 30 may be implemented with a flexible link 32 instead of the connectors 32. The flexible link 32 may comprise a printed circuit board portion which is less than 255 micrometers thick, comprising signal traces 6 and/or power traces 7 made of flexible solder mask. Alternatively, the flexible link 32 may comprise a dielectric film which is less than 255 micrometers thick, comprising signal traces 6 and/or power traces 7 made of electrically conducting traces e.g. copper sheets. The cross-sectional area of a power trace 7 on the flexible link 32 is substantially larger than the cross-sectional area of a signal trace 6 on the flexible link 32.

The third printed circuit board portion 30 may be connected through at least one flexible link 32 to the signal traces 6 and/or power traces 7 of at least one of the first and the second printed circuit board portions 10, 20. Preferably, the signal traces 6 of the first and the second printed circuit board portion 10, 20 are connected to signal traces 6 on a flexible link 32 and the power traces 7 of the first and the second printed circuit board portion 10, 20 are connected to power traces 7 on a flexible link 32.

Preferably, the third printed circuit board portion 30 is perpendicular to the first and the second printed circuit board portions 10, 20 as illustrated in FIG. 1. Further, the battery pack 1 comprises framework structures 8 between the battery cells 2 and the first printed circuit board portion 10 and the second printed circuit board portion 20 as shown in FIG. 1. Preferably, the framework structures 8 are plastic or aluminum. The framework structures 8 comprise holes for battery cells 2. When the battery cells 2 are arranged in the holes of the framework structure 8, the framework structures 8 may be fixed together, preferably with screws, preventing the battery cells 2 to move and providing a rigid structure for the battery pack 1. Further, the printed circuit board portions 10, 20, 30 may be attached to the framework structures 8, preferably with screws.

The battery pack condition management unit 31 comprises a voltage measurement unit 37 connected to the signal traces 6 of the first and the second printed circuit board portion 10, 20. Further, the voltage measurement unit 37 is configured to measure or detect voltage across the battery cell terminals 3, 4.

The battery pack condition management unit 31 may comprise a temperature measurement unit, which measures the temperature inside the battery pack 1. In an embodiment, the temperature measurement unit can measure temperature of at least one battery cells 2. Preferably, the temperature measurement unit can measure the temperatures of each battery cell 2 of the battery pack 1. The temperature measurement unit locates on the third printed circuit board portion 30.

The battery pack 1 may comprise main switch electrically connected between the output terminals 33 and the battery cells 2. When the main switch is in a conducting state, the battery pack 1 may supply power to the output terminals 33. When the main switch is in a non-conducting state, the battery pack 1 is prevented to supply power to the output terminals 33. The battery pack condition management unit 31 is configured to control the state of the main switch based on the condition of the battery pack 1. Preferably, in a normal operation, the battery pack condition management unit 31 is configured to control the main switch to stay in a conducting state. Further, in case the battery pack condition management unit 31 detects that the condition of the battery pack 1 has decreased below a threshold limit, it controls the main switch to stay in a non-conducting state. Preferably, after detecting that the condition of the battery pack 1 is below a threshold limit and the main switch is in a non-conducting state, the battery pack condition management unit 31 is configured to connect the discharge load 31 by means of the switch 31 across terminals 3, 4 of battery cells 2 discharging the battery pack 1 to a safe charge level.

The third printed circuit board portion 30 may comprise a communication link 34 to communicate with an external device, and wherein the battery pack condition management unit 31 is configured to send operational information of the battery pack 1 via the communication link 34. The operational information may comprise at least one of the voltage measurement result, detection result, temperature measurement result, condition information of the battery pack 1, condition information of a battery cell 2.

Preferably, the output terminals 33 and the communication link 34 are combined to a single output connector 35 on the third printed circuit board portion 30 and signal traces 6 on the third printed circuit board portion 30 are connected to the communication link 34 and power traces 7 on the third printed circuit board portion 30 are connected to the output terminals 33. Preferably, the output connector 35 comprises guiding means, which facilitate the connection of the output connector 35 and the battery pack 1, preventing unintended contact between the output terminals 33 and contacts of the connector to which the output connector 35 is connected to.

The battery pack condition management unit 31 may comprise a non-volatile memory 36. Further, the battery pack condition management unit 31 may be configured to store voltage detection results of the voltage measurement unit 37 to the non-volatile memory 36. Additionally, the battery pack condition management unit 31 is configured to determine the condition of at least one battery cell 2 by comparing voltage detection results of the voltage measurement unit 37 to the voltage detection results stored in the non-volatile memory 36.

In a preferred embodiment, the battery pack condition management unit 31 is configured to store temperature measurement results of the temperature measurement unit to the non-volatile memory 36. Additionally, the battery pack condition management unit 31 is configured to determine the condition of at least one battery cell 2 by comparing temperature measurement results of the temperature measurement unit to the temperature measurement results stored in the non-volatile memory 36.

The battery pack condition management unit 31 may comprise at least one discharge load 31 and at least one switch 31. Further, the battery pack condition management unit 31 is configured to connect the discharge load 31 by means of the switch 31 across terminals 3, 4 of at least one battery cell 2. Preferably the battery pack condition management unit 31 connects a discharge load 31 across connection interfaces 5 of a battery cell 2 when said battery cell 2 has overcharge or higher charge level than the rest of the battery cells 2 in the battery pack 1. In an embodiment, the battery pack 1 comprises a separate series-connection of a discharge load 31 and a switch 31 connected across the terminals 3, 4 of each battery cell 2.

Figure 4:
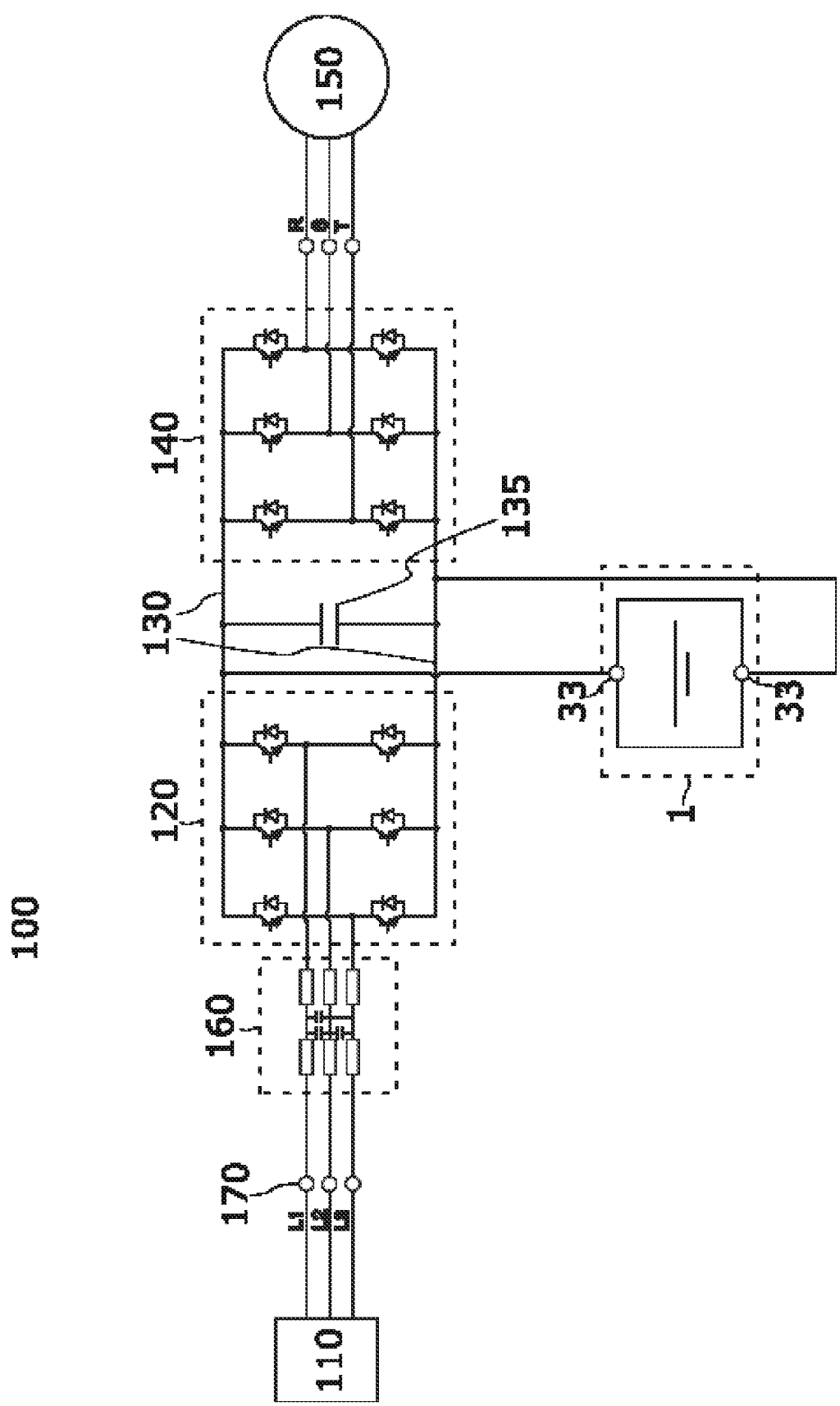
FIG. 4 illustrates schematically a frequency converter according to an embodiment.
Figure 6:
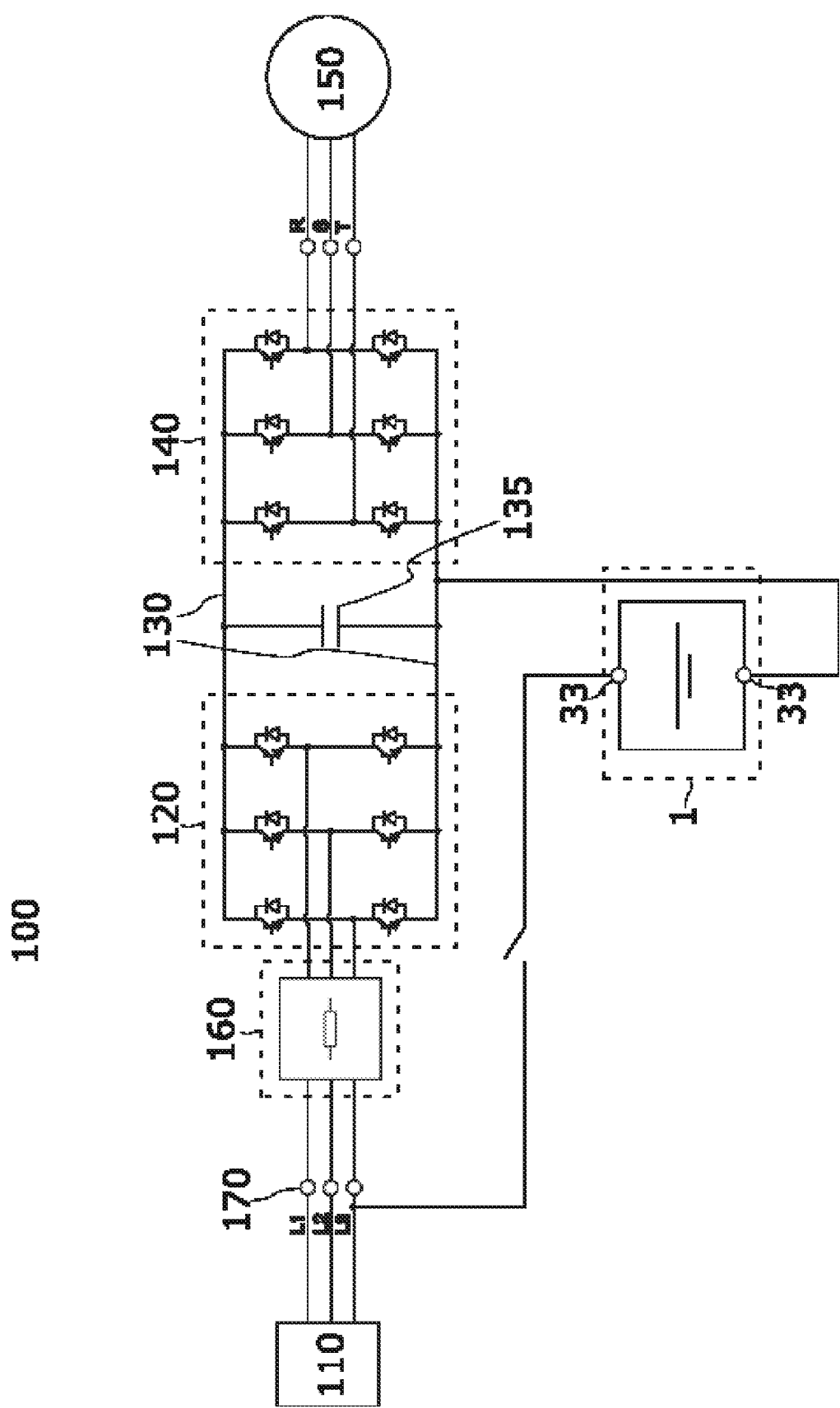
FIG. 6 illustrates schematically a frequency converter according to an embodiment.

FIG. 4 shows a frequency converter 100, comprising a battery pack 1 as described in the embodiments above. Further, the frequency converter 100 comprises a rectifier bridge 120, having alternating current (AC) terminals 170 electrically connected or connectable to a grid 110, an inverter bridge 140 to supply a motor 150 and a direct current link 130, comprising a capacitor 135. The direct current link 130 is connecting the rectifier bridge 120 and the inverter bridge 140. In some embodiments, the output terminals 33 of the battery pack 1 are electrically connected either directly or via a separate converter to the direct current link 130 of the frequency converter 100. In some other embodiments, at least one output terminal 33 of the battery pack 1 is electrically connected or connectable to the AC terminal 170 of the rectifier bridge 120 (see FIG. 6). In FIG. 4, the L1, L2 and L3 represent line phases of the grid 110 and R, S, T represent inputs of a three phase motor 150. In an embodiment, the battery pack 1 is electrically connected to the direct current link 130 of the frequency converter 100 via at least one of a diode, a switch, a current measurement means, a resistor, a filter and an inductor. Further, a filter 160 may connected between the grid 110 and the rectifier bridge 120 as shown in FIG. 4. Preferably the filter 160 is an inductor or a LCL filter.

Figure 5:
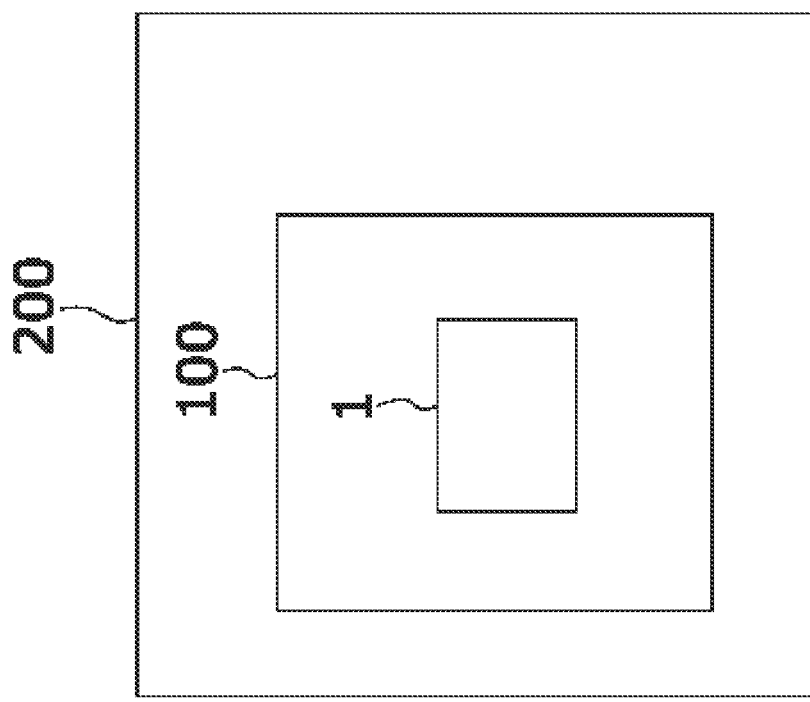
FIG. 5 illustrates schematically a transport system according to an embodiment.

FIG. 5 shows a transport system 200, comprising a battery pack 1 as described in the embodiments above. In an embodiment, the transport system 200 is an elevator system comprising at least one frequency converter 100, at least one electric motor 150, at least one machinery brake, at least one elevator car and at least one elevator system controller.

It is emphasized that identical parts or parts with the same functionality are designated by the same reference numbers in all figures.

The invention can be carried out within the scope of the appended patent claims. Thus, the above-mentioned embodiments should not be understood as delimiting the invention.

LIST OF NUMBERS 1 battery pack
2 battery cell
3 positive terminal
4 negative terminal
5 connection interface, nickel strip
6 signal trace
7 power trace
8 framework structure
10 first printed circuit board portion
20 second printed circuit board portion
30 third printed circuit board portion 31 battery pack condition management unit, discharge load, switch
32 connector, power connector, flexible link
33 output terminal
34 communication link
35 output connector
36 non-volatile memory
37 voltage measurement unit
100 frequency converter
110 grid
120 rectifier bridge
130 direct current link
135 capacitor
140 inverter bridge
150 motor
160 filter
170 AC terminal
200 transport system

The invention claimed is:

1. A battery pack comprising:
   plurality of battery cells arranged consecutively, each of said battery cells including a positive and a negative terminal on opposite sides of the battery cells, the battery cells being electrically connected in series with each other, wherein the terminals of the plurality of battery cells are arranged on two opposite sides of the battery pack such that positive and negative terminals of the consecutive battery cells are on both sides of the battery pack by turns next to each other;
   first and second printed circuit board portions arranged on the two opposite sides of the battery pack, respectively, the first and second printed circuit board portions each including connection interfaces and signal traces, the connection interfaces being arranged next to the terminals of the battery cells, and the signal traces connected to the terminals of the battery cells via the connection interfaces; and
   a third printed circuit board portion arranged next to the battery cells and extending between the first and second printed circuit board portions, the third printed circuit board portion including a battery pack condition management unit connected to the signal traces of the first and second printed circuit board portions, the third printed circuit board portion being connected through at least one flexible link to the signal traces of at least one of the first and second printed circuit board portions.

2. The battery pack according to claim 1, wherein the battery cells are lithium-ion battery cells.

3. The battery pack according to claim 1, wherein a shape of the battery cells is cylindrical.

4. The battery pack according to claim 1, wherein the battery cells are arranged side by side in at least two rows.

5. The battery pack according to claim 1, wherein the battery cells are connected in series by nickel strips welded between the positive and negative terminals of the consecutive battery cells.

6. The battery pack according to claim 1, wherein the third printed circuit board portion is connected through connectors to the signal traces of the first and second printed circuit board portions.

7. The battery pack according to claim 1, wherein the third printed circuit board portion comprises output terminals of the battery pack.

8. The battery pack according to claim 7, wherein at least one of the first and second printed circuit board portions comprises:
   a power trace connected between a battery cell terminal and an output terminal of the battery pack.

9. The battery pack according to claim 8, wherein the third printed circuit board portion is connected through a power connector to the power trace of the at least one of the first and second printed circuit board portions.

10. The battery pack according to claim 1, wherein the flexible link comprises:
    a printed circuit board portion which is less than 255 micrometers thick and comprises flexible solder mask.

11. The battery pack according to claim 1, wherein the flexible link comprises a dielectric film which is less than 255 micrometers thick and comprises electrically conducting traces.

12. The battery pack according to claim 1, wherein the battery pack condition management unit comprises a voltage measurement unit connected to the signal traces of the first and the second printed circuit board portions.

13. The battery pack according to claim 1, wherein the third printed circuit board portion comprises a communication link to communicate with an external device external to the battery pack, and wherein the battery pack condition management unit is configured to send operational information of the battery pack via the communication link.

14. The battery pack according to claim 13, wherein output terminals of the battery pack and the communication link are combined to a single output connector on the third printed circuit board portion.

15. A transport system comprising:
    the battery pack according to claim 1.

16. A frequency converter comprising:
    the battery pack according to claim 1;
    a rectifier bridge having AC terminals electrically connected or connectable to a grid;
    an inverter bridge to supply a motor; and
    a direct current link including a capacitor, the direct current link connecting the rectifier bridge and the inverter bridge,
       wherein output terminals of the battery pack are electrically connected to the direct current link of the frequency converter or wherein at least one output terminal of the battery pack is electrically connectable to the AC terminals of the rectifier bridge.

* * * * *